(12) United States Patent
Oh

(10) Patent No.: US 6,596,047 B2
(45) Date of Patent: Jul. 22, 2003

(54) CYCLONE DUST COLLECTING APPARATUS FOR A VACUUM CLEANER

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 10/083,335

(22) Filed: Feb. 26, 2002

(65) Prior Publication Data

US 2002/0178702 A1 Dec. 5, 2002

(30) Foreign Application Priority Data

May 29, 2001 (KR) ........................................ 2001-29828

(51) Int. Cl.[7] .............................................. B01D 45/12
(52) U.S. Cl. .......................... 55/426; 55/429; 55/459.1; 55/DIG. 3
(58) Field of Search .................... 55/395, 424, 426, 55/429, 459.1, DIG. 3

(56) References Cited

U.S. PATENT DOCUMENTS 2,096,484 A * 10/1937 Farmer ........................ 55/313
2,542,634 A * 2/1951 Davis et al. .................. 55/426
4,389,307 A    6/1983 Boadway
6,231,645 B1 * 5/2001 Conrad et al. ................ 95/271

FOREIGN PATENT DOCUMENTS

| GB | 2330786 | 5/1999 |
|----|---------|--------|
| GB | 2367019 | 3/2002 |
| WO | WO 9922874 | 5/1999 |

* cited by examiner

Primary Examiner—Robert A. Hopkins
(74) Attorney, Agent, or Firm—Ladas & Parry

(57) ABSTRACT

A cyclone dust collecting apparatus includes at least a cyclone body, a filth-collection portion and, a filth-guiding unit. The cyclone body separates filth from air drawn through an air-suction passage and discharges cleaned air through an air-discharging passage. The filth-collecting portion, which is removably connected to the cyclone body by a filth-discharging passage, collects the filth separated by the cyclone body. The filth-guiding unit guides the filth in the cyclone body to the filth-discharging passage. The filth separated from the air may easily flow to the filth-collecting portion and this separation prevents the filth from remaining in the cyclone body.

10 Claims, 3 Drawing Sheets

CYCLONE DUST COLLECTING APPARATUS FOR A VACUUM CLEANER

BACKGROUND OF THE INVENTION

1. Field of the Invention

The present invention relates to a cyclone dust-collecting apparatus for a vacuum cleaner, and more particularly to a cyclone dust-collecting apparatus in which a cyclone body and a filth-collecting portion are connected by a filth-discharging passage.

2. Description of the Related Art

FIG. 1 shows one example of a conventional cyclone dust-collecting apparatus for a vacuum cleaner. According to FIG. 1, conventional cyclone dust-collecting apparatus 10 for a vacuum cleaner includes cyclone body 20, filth-collecting portion 30, and partition 40.

Air-suction passage 21, connected to a brush assembly (not shown) of the vacuum cleaner, is disposed at an upper part of cyclone body 20. Air-discharging passage 22, connected to a vacuum-generating device (not shown), is disposed at an upper center part of cyclone body 20.

Filth-collecting portion 30 is usually removably formed at a lower part of cyclone body 20 for easy removal of filth that has been separated and collected by cyclone body 20.

Partition 40 is disposed between cyclone body 20 and filth-collecting portion 30. Filth-discharging passage 41 is formed at one side of partition 40 for guiding the filth separated by cyclone body 20.

For conventional cyclone clust-collecting apparatus 10 of a vacuum cleaner with the above construction, filth-laden air from a cleaning surface is drawn to cyclone body 20 through air-suction passage 21 when the vacuum-generating device of the vacuum cleaner is operated.

The air, drawn into cyclone body 20, forms a whirling air current, and filth contained in the air is separated by centrifugal force and collected in filth-collecting portion 30 through filth-discharging passage 41. The cleaned air is discharged through air-discharging passage 22.

On the other hand, filth that has not been separated from the air flows to a center part of partition 40 along the flow of the air. The filth remains in cyclone body 20 and is not collected in filth-collecting portion 30. The filth remaining in cyclone body 20 is not easily removed when a user separates filth-collecting portion 30 from cyclone body 20 to empty filth-collecting portion 30.

Moreover, filth remaining in cyclone body 20 flows to the vacuum-generating device through air-discharging passage 22 and decreases the dust-collecting function of the vacuum cleaner by clogging the air circulation of a filter formed at an upper part of the vacuum-generating device.

SUMMARY OF THE INVENTION

An embodiment provides a cyclone dust-collecting apparatus of a vacuum cleaner for preventing filth from remaining in a cyclone body by guiding the filth, separated from the air, to a filth-collecting portion.

The embodiment may provide a cyclone dust-collecting apparatus for a vacuum cleaner, which may include: a cyclone body for separating filth from air drawn through an air-suction passage and discharging the cleaned air through an air-discharging passage; a filth-collecting portion, removably connected to the cyclone body by a filth-discharging passage, for collecting the filth separated by the cyclone body; and filth-guiding means for guiding the filth in the cyclone body to the filth-discharging passage. The filth-guiding means may include at least some part that has more than 30° of slope and has a side sloping downwardly towards a side of the cyclone body. The sloping side may extend to about 10 mm to about 20 mm from the side of the cyclone body.

Another embodiment of a cyclone dust-collecting apparatus for a vacuum cleaner may include: a cyclone body for separating filth from the air drawn through an air-suction passage and discharging the cleaned air through an air-discharging passage; a filth-collecting portion, removably connected to the cyclone body by a filth-discharging passage, for collecting the filth separated by the cyclone body; and a dome-shaped portion protruding from a lower center part of the cyclone body to the air-discharging passage. The dome-shaped portion may extend to about 10 mm to about 20 mm from the side of the cyclone body and may include at least some part that has more than 30° of slope.

A further embodiment of a cyclone dust-collecting apparatus for a vacuum cleaner may include: a cyclone body for separating filth from the air drawn through an air-suction passage and for discharging the cleaned air through an air-discharging passage; a filth-collecting portion, removably disposed at a lower part of the cyclone body, for collecting the filth separated by the cyclone body; a partition, disposed between the cyclone body and the filth-collecting portion, having a filth-discharging passage at one side; and a dome-shaped portion protruding from the center of the partition towards the air-discharging passage of the cyclone body. The angle between a lower front end of the dome-shaped portion and a horizontal surface of the partition may be more than 30°. The distance between the lower front end of the dome-shaped portion and the cyclone body may be about 10 mm to about 20 mm.

BRIEF DESCRIPTION OF THE DRAWINGS

Further advantages of the present invention will become apparent to those skilled in the art with the benefit of the following detailed description of embodiments and upon reference to the accompanying drawings in which.

Figure 1:
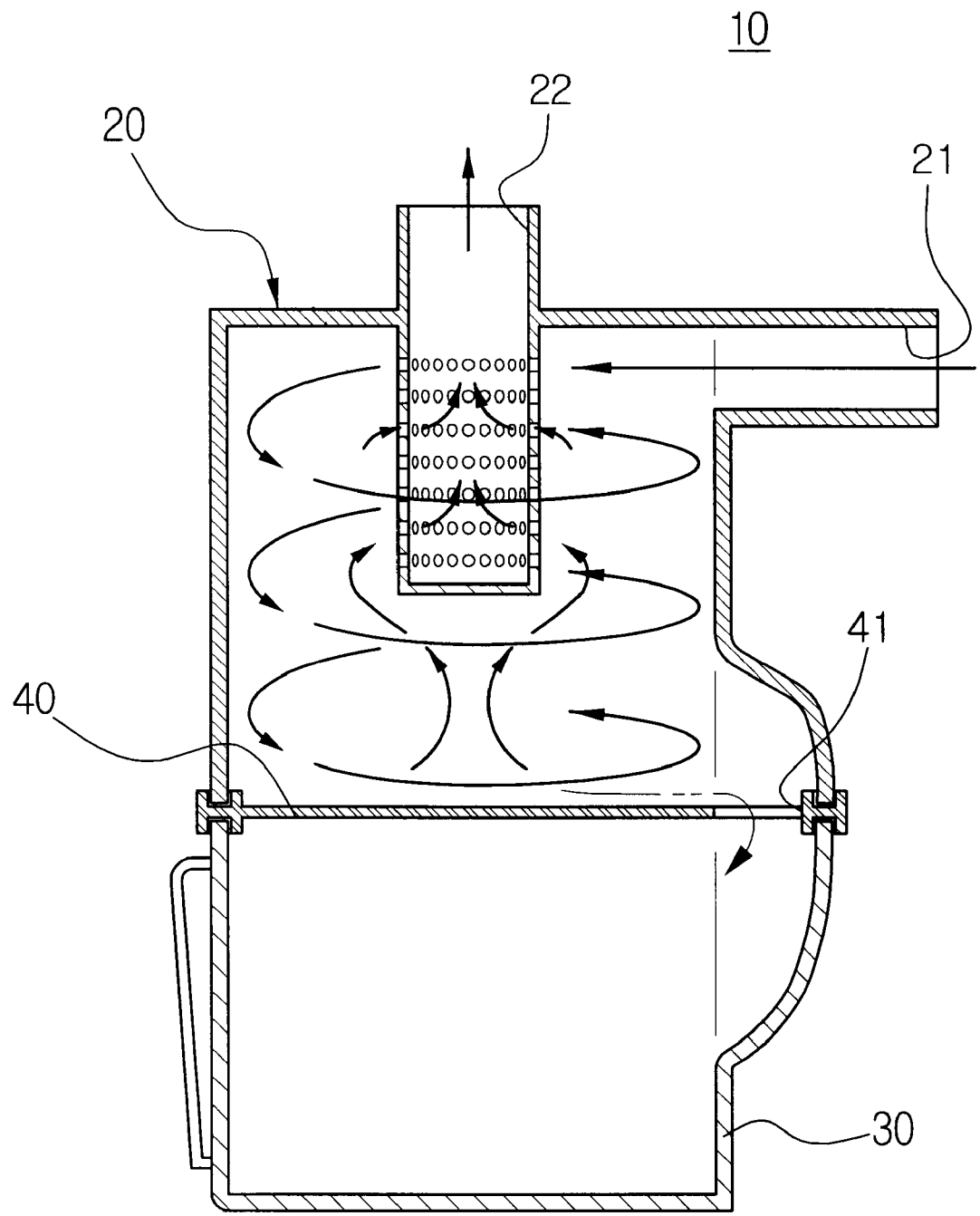
FIG. 1 is a sectional view showing a conventional cyclone dust-collecting apparatus.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 2:
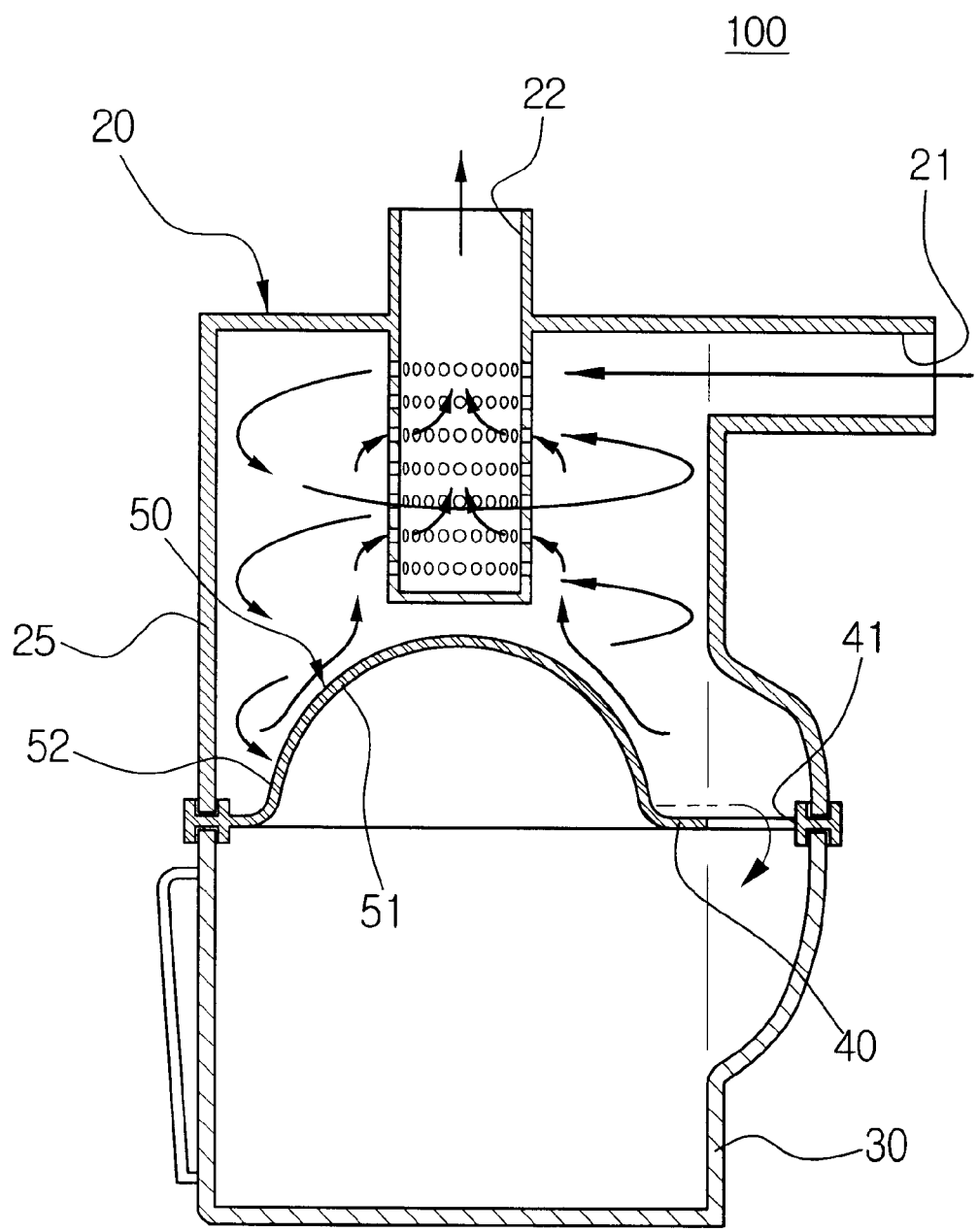
FIG. 2 is a sectional view of an embodiment showing a cyclone dust-collecting apparatus for a vacuum cleaner.

FIG. 2 shows an embodiment of a cyclone dust-collecting apparatus for a vacuum cleaner. According to FIG. 2, cyclone dust-collecting apparatus 100 may include filth-collecting portion 30, partition 40, and filth-guiding means 50.

Air-suction passage 21 may be connected to a brush assembly (not shown) of the vacuum cleaner and may be disposed at an upper part of cyclone body 20. Air-discharging passage 22 may be connected to a vacuum-generating device (not shown) and may be disposed at an upper center of cyclone body 20.

Filth-collecting portion 30 maybe removably disposed at a lower part of cyclone body 20 for easy removal of filth that has been separated by cyclone body 20. Partition 40 may be disposed between cyclone body 20 and filth-collecting portion 30. Filth-discharging passage 41 may be formed at one side of partition 40 for passing the filth that has been separated by cyclone body 20.

Filth-guiding means 50 may push the filth in cyclone body 20 outward in a radial direction. Accordingly, the filth in cyclone body 20 may be affected by centrifugal force as the filth is whirled along a whirling air current. Filth-guiding means 50 may include dome-shaped portion 51 protruding from a center of partition 40 toward air-discharging passage 22 of cyclone body 20. Dome-shaped portion 51 may have sloping side 52 which pushes the filth outward in a radial direction.

Figure 3:
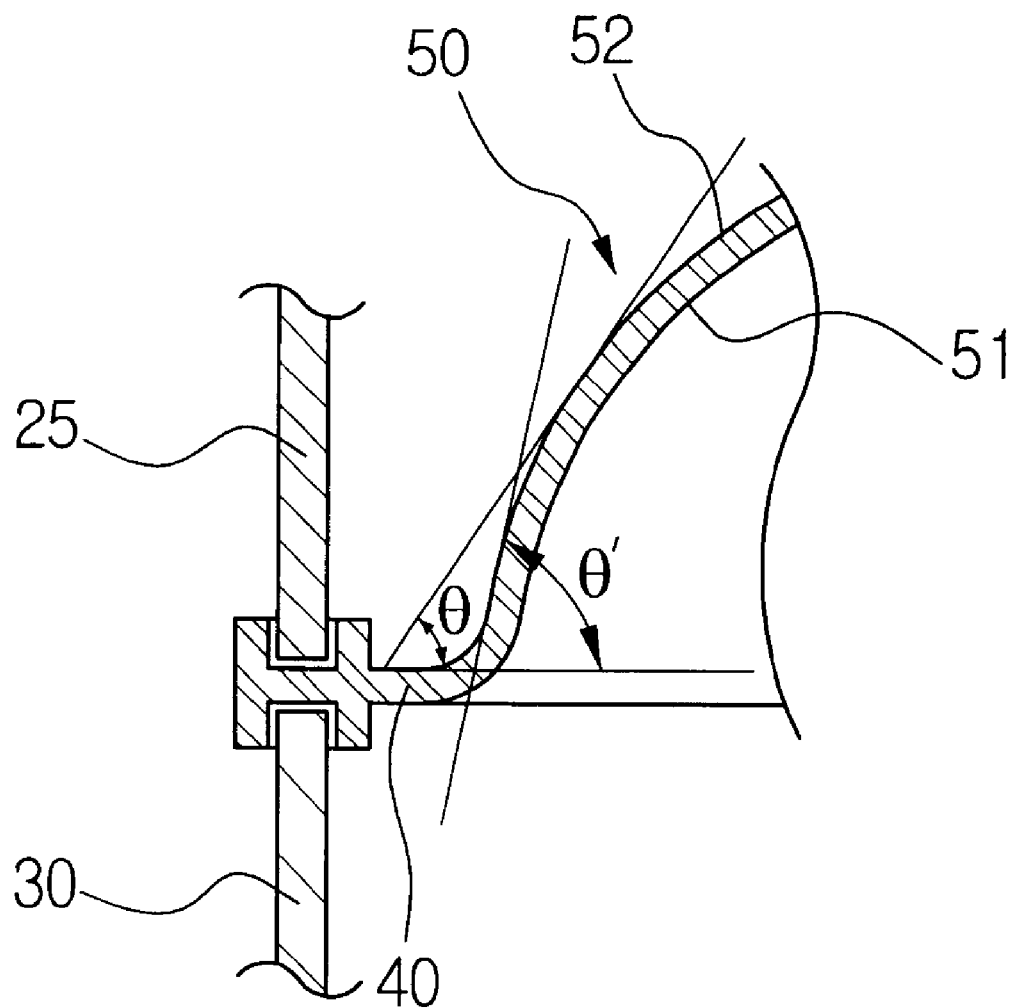
FIG. 3 is a partial sectional view of an embodiment showing a cyclone dust-collecting apparatus for a vacuum cleaner.

As shown in FIG. 3, an angle θ may be defined between sloping side 52 and partition 40. The function of filth-guiding means 50 may be more easily performed if θ is large and the front end of sloping side 52 is close to a side of cyclone body 20.

Angle θ' shown in FIG. 3, defined between sloping side 52 at a front end of dome-shaped portion 51 and partition 40, may be more than about 30°. Dome-shaped portion 51 may extend to about 10 mm to about 20 mm from side 25 of cyclone body 20.

When the vacuum-generating device of cyclone dust-collecting apparatus 100 is operated, the air, containing filth from a cleaning surface, may be drawn into cyclone body 20 through a brush assembly and air-suction passage 21. The drawn air may form a whirling air current, and the filth in the air current may be separated by centrifugal force and collected in filth-collecting portion 30 through filth-discharging passage 41. The cleaned air may be discharged through air-discharging passage 22.

Filth not separated from the air may tend to move to a center part of partition 40 along the flow of the air. Sloping side 52 of dome-shaped portion 51 may hinder the movement of the filth to the center part of partition 40. Therefore, the filth cannot move easily and may be whirled again in the whirling air current.

The filth, whirled again in the whirling air current, may be separated from the air due to the centrifugal force and collected in filth-collecting portion 30 through filth-discharging passage 41. The possibility of the filth remaining in cyclone body 20 may be substantially decreased.

Since the filth easily moves to filth-collecting portion 30, an amount of filth that moves to the vacuum-generating device through air-discharging passage 22 along the air current may substantially decrease. Thus, the dust-collecting function of the vacuum cleaner may substantially improve.

Cyclone body 20 and filth-collecting portion 30, separated by partition 40, may be applied to any type of cyclone dust-collecting apparatus if the cyclone body and the filth-collecting portion are connected to each other by a filth-discharging passage.

The filth-guiding means may be, but is not limited to, dome-shaped portion 51 as described herein. Filth-guiding means 50 may be any shape with a sloping side; for example, the filth-guiding means may be conical-shaped.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A cyclone dust-collecting apparatus for a vacuum cleaner, comprising:
   a cyclone body configured to separate filth from air drawn through an air-suction passage, and further configured to discharge clean air through an air-discharging passage;
   a filth-collecting portion removably connected to the cyclone body by a filth-discharging passage configured to collect the filth separated by the cyclone body; and
   filth-guiding means disposed between the cyclone body and the filth collecting portion for guiding the filth in the cyclone body to the filth-discharging passage wherein a portion of the radial ends of the filth guiding means is supported by one or bath of the cyclone body and the filth collecting portion.

2. A cyclone dust-collecting apparatus for a vacuum cleaner comprising:
   a cyclone body configured to separate filth from air drawn through an air-suction passage, and further configured to discharge clean air through an air-discharging passage;
   a filth-collecting portion removably connected to the cyclone body a filth-discharging passage configured to collect the filth separated by the cyclone body; and
   filth-guiding means for guiding the filth in the cyclone body to the filth-discharging passage, wherein the filth-guiding means comprises a sloping side that extends to a side of the cyclone body.

3. The cyclone dust-collecting apparatus for a vacuum cleaner of claim 2, wherein the filth-guiding means comprises a side sloping downwardly towards a side of the cyclone body.

4. The cyclone dust-collecting apparatus for a vacuum cleaner of claim 2, wherein the filth-guiding means comprises a side sloping downwardly more than about 30° towards a side of the cyclone body.

5. The cyclone dust-collecting apparatus for a vacuum cleaner of claim 2, wherein the filth-guiding means comprises a sloping side, and wherein a distance between a front end of the sloping side and a side of the cyclone body is about 10 mm to about 20 mm.

6. A cyclone dust-collecting apparatus fur a vacuum cleaner, comprising:
   a cyclone body configured to separate filth from air drawn Through an air-suction passage, and further configured to discharge clean air trough an air-discharging passage, wherein the cyclone body comprises a dome-shaped portion protruding from a lower center part of the cyclone body to the air-discharging passage; and a filth-collecting portion removably connected to the cyclone body by a filth-discharging passage configured to collect the filth separated by the cyclone body.

7. The cyclone dust-collecting apparatus for a vacuum cleaner of claim 6, wherein the dome-shaped portion comprises at least a part sloping more than about 30°.

8. The cyclone dust-collecting apparatus for a vacuum cleaner of claim 6, wherein a lower front end of the dome-shaped portion extends to a side of the cyclone body.

9. The cyclone dust-collecting apparatus for a vacuum cleaner of claim 6, wherein a distance between a lower front end of the dome-shaped portion and a side of the cyclone body is about 10 mm to about 20 mm.

10. A cyclone dust-collecting apparatus for a vacuum cleaner, comprising;

a cyclone body configured to separate filth from air drawn through an air-suction passage, and further configured discharge clean air through an air-discharging passage, wherein the cyclone body comprising a dome-shaped portion protruding from a lower center part of the cyclone body to the air-discharging passage;

a filth-collecting portion removably disposed at a lower part of the cyclone body configured to collect the filth separated by the cyclone body; and a partition disposed between the cyclone body and the filth-collecting portion, the partition comprising a filth-discharging passage formed at one side;

wherein an angle formed between a lower front end of the dome-shaped portion and a horizontal surface of the partition is more than about 30°, and wherein a distance between the lower front end of the dome-shaped portion and the cyclone body is about 10 mm to about 20 mm.

* * * * *